March 16, 1965     C. W. VERRELL ETAL     3,173,511
AERIAL TOWER
Filed Aug. 22, 1961     11 Sheets-Sheet 1
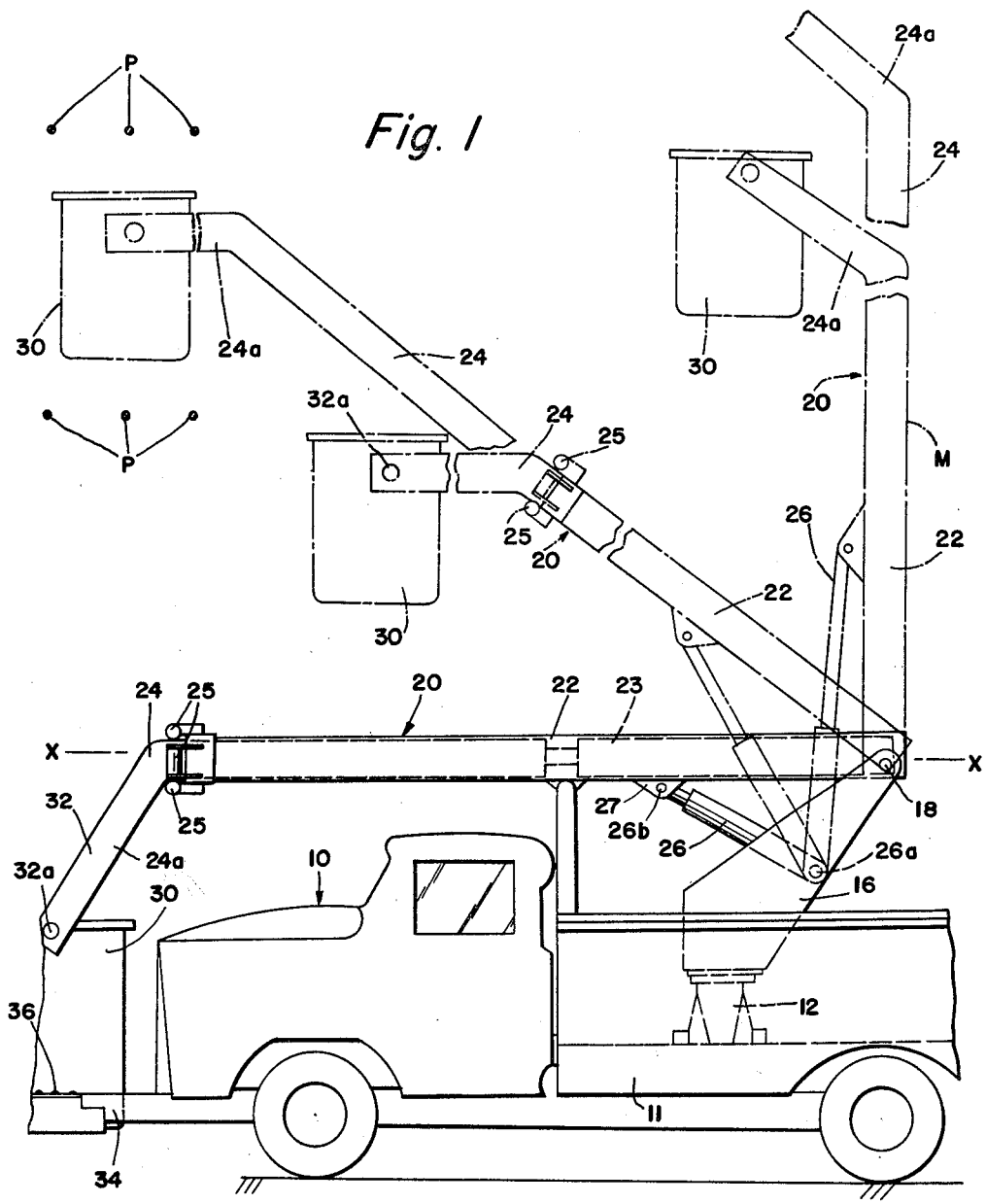
INVENTORS
CURTIS W. VERRELL
GEORGE H. ECKELS
BY HERMAN J. TROCHE
Jeare, Fetzer & Jeare
ATTORNEYS March 16, 1965  C. W. VERRELL ETAL  3,173,511
AERIAL TOWER
Filed Aug. 22, 1961  11 Sheets-Sheet 2
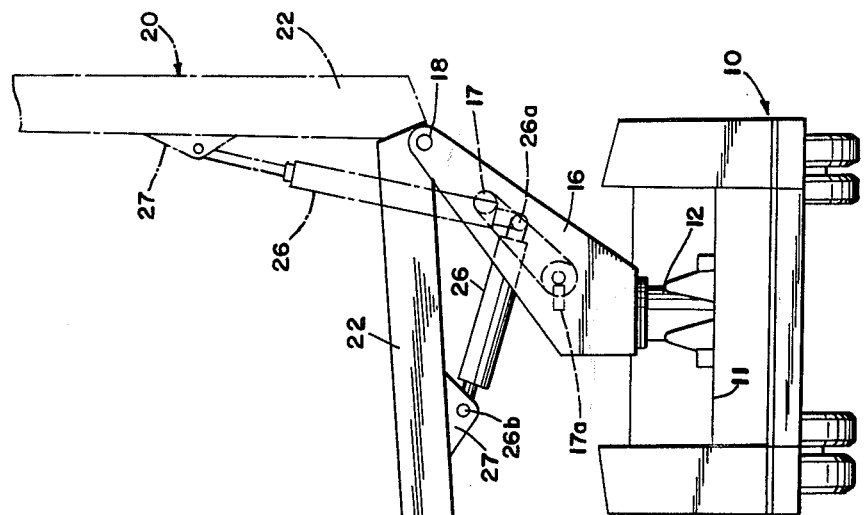
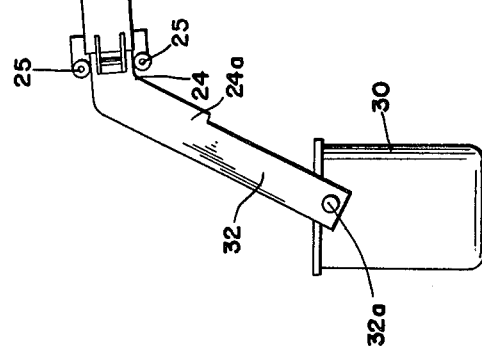
INVENTORS
CURTIS W. VERRELL
GEORGE H. ECKELS
BY HERMAN J. TROCHE
ATTORNEYS March 16, 1965 C. W. VERRELL ETAL 3,173,511
AERIAL TOWER Filed Aug. 22, 1961 11 Sheets-Sheet 3

INVENTORS
CURTIS W. VERRELL
GEORGE H. ECKELS
BY HERMAN J. TROCHE

Jeare, Fetzer & Jeare
ATTORNEYS

March 16, 1965  C. W. VERRELL ETAL  3,173,511
AERIAL TOWER
Filed Aug. 22, 1961  11 Sheets-Sheet 4
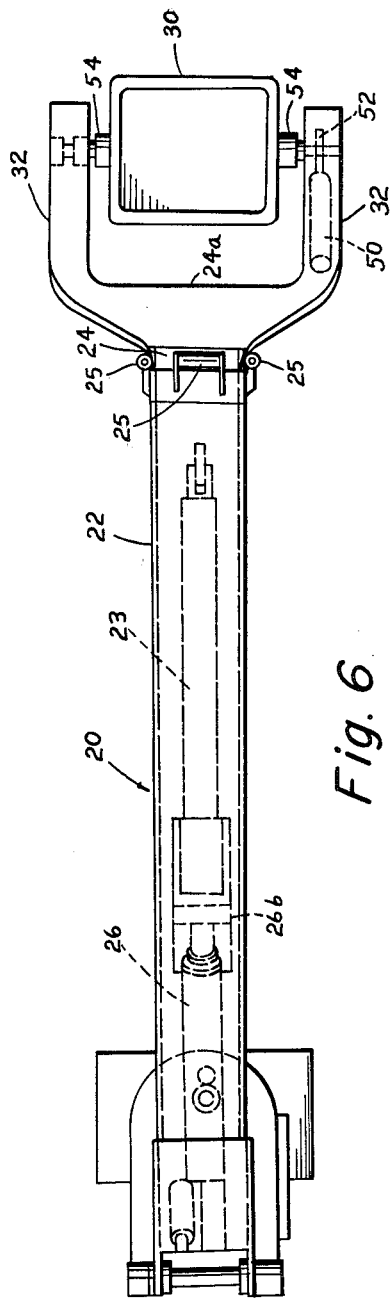
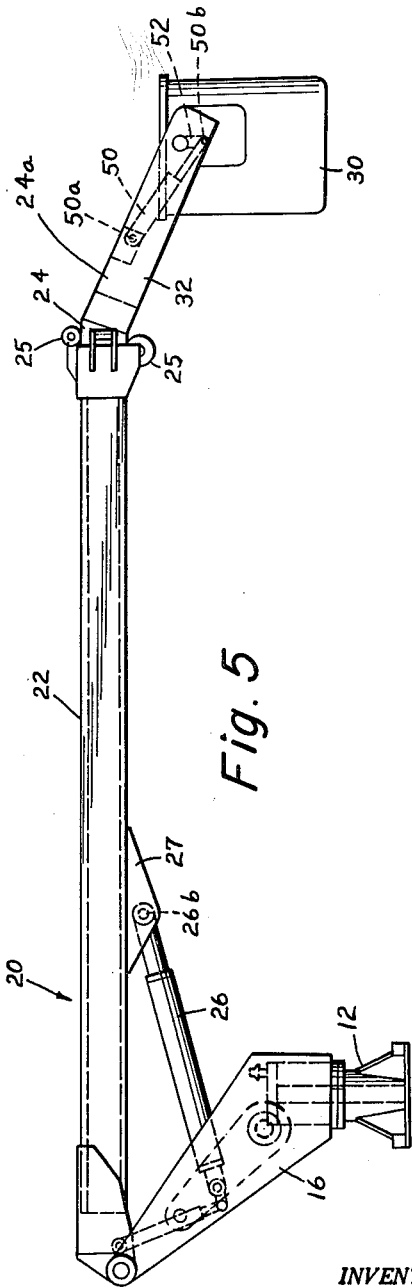
INVENTORS
CURTIS W. VERRELL
GEORGE H. ECKELS
HERMAN J. TROCHE
BY
*Teare, Fetzer & Teare*
ATTORNEYS March 16, 1965  C. W. VERRELL ETAL  3,173,511
AERIAL TOWER Filed Aug. 22, 1961  11 Sheets-Sheet 7

INVENTOR
CURTIS W. VERRELL
GEORGE H. ECKELS
BY HERMAN J. TROCHE

ATTORNEYS

March 16, 1965 C. W. VERRELL ETAL 3,173,511
AERIAL TOWER
Filed Aug. 22, 1961 11 Sheets-Sheet 9

INVENTORS
CURTIS W. VERRELL
GEORGE H. ECKELS
HERMAN J. TROCHE
BY
ATTORNEYS

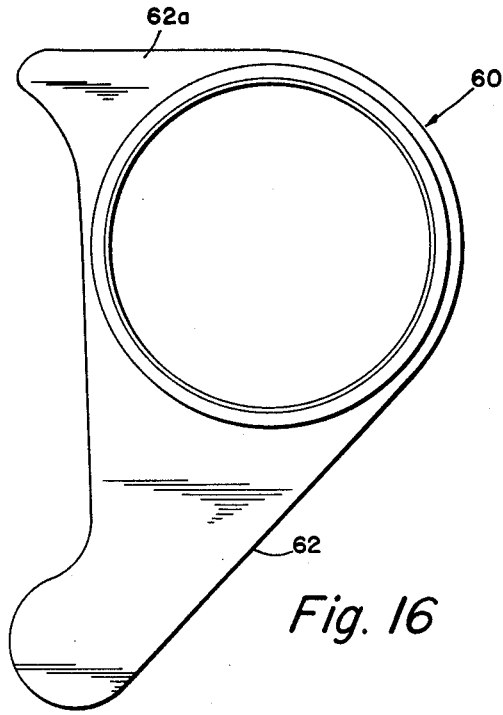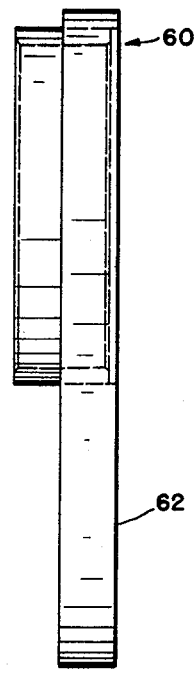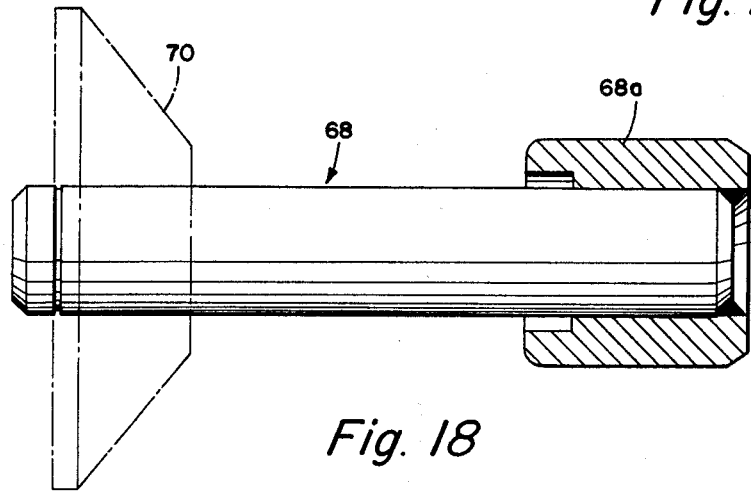

March 16, 1965   C. W. VERRELL ETAL   3,173,511
AERIAL TOWER

Filed Aug. 22, 1961   11 Sheets-Sheet 11

INVENTORS
CURTIS W. VERRELL
BY GEORGE H. ECKELS
HERMAN J. TROCHE

Teare, Teetzer & Teare
ATTORNEYS

United States Patent Office 3,173,511
Patented Mar. 16, 1965

3,173,511
AERIAL TOWER
Curtis W. Verrell, Fairview Park, George H. Eckels, Lakewood, and Herman J. Troche, Fairview Park, Ohio, assignors, by mesne assignments, to The Ohio Brass Company, Mansfield, Ohio, a corporation of New Jersey
Filed Aug. 22, 1961, Ser. No. 133,105
10 Claims. (Cl. 182—2)

This invention relates in general to an aerial tower having work platform or personnel bucket structure mounted adjacent the outer end of an adjustable boom structure, and more particularly relates to a preferably vehicle mounted tower arrangement wherein the work platform structure on the boom is adapted to be offset from the longitudinal center line of the main portion of the boom, to provide for a possible lower storage position of the work platform on the vehicle, and for extra clearance of the work platform and boom in working positions.

Accordingly, an object of the invention is to provide an improved tower structure for positioning a workman adjacent an object or objects to be worked upon.

Another object of the invention is to provide a tower structure of the above mentioned type, wherein the tower boom can be rotated in a generally horizontal plane through a full 360°, and wherein the boom arm can be swung in a generally vertical plane through an angular range of movement preferably in excess of 90°.

Another object of the invention is to provide a tower boom of the above mentioned type wherein the boom arm is extensible comprising a main section and an auxiliary extensible section, and wherein the work platform structure is carried by said auxiliary section, the latter comprising an outer end portion which is offset from the center line of the boom's main section and in a direction to provide for lower orientation of the work platform or personnel bucket when the boom is in storage position, and providing for extra clearance with respect to the objects, such as for instance power lines, being worked upon.

A still further object of the invention is to provide a mobile tower structure having personnel bucket structure adjustably mounted on the tower boom adjacent an end thereof and wherein the tower boom is comprised of a main section and an auxiliary extensible section, with the latter section being articulated, and including a swingable bucket supporting portion normally extending diagonally with respect to the longitudinal center line of the main section of the boom, but which is automatically moved into general alignment with the main boom section, upon retraction of the auxiliary extensible section a predetermined amount.

Other objects and advantages of the invention will be apparent from the following description taken in conjunction with the accompanying drawings wherein:

FIG. 1 is a side elevational view of a tower arrangement embodying the invention, and as mounted on a vehicle; the full line showing in FIG. 1 illustrates the position of the boom and work platform when the boom is in carried or storage position on the vehicle, and the phantom, and the phantom lines represent various elevated and extended positions of the work platform occasioned by selective control of the motor units employed for actuating the tower boom.

FIG. 2 is a rear-end elevational view of the FIG. 1 showing and illustrating in full lines the boom swung laterally to one side of the mounting vehicle and with the work basket being disposed in close proximity to ground level by pivotal movement of the boom arm below a horizontal plane passing through the pivotal axis of the boom arm in its vertical plane of movement.

FIG. 3 is a fragmentary top plan view of the yoke arrangement for mounting the work platform basket of the FIGS. 1 and 2 embodiment on the free end of the auxiliary section of the boom arm;

FIG. 5 is an enlarged, side elevational view of a further embodiment of the tower structure, and more particularly one wherein the bucket structure on the tower boom is adapted for fluid motor power adjustment in its swingable movement with respect to the boom;

FIG. 6 is a top plan view of the FIG. 5 arrangement;

Figure 7:
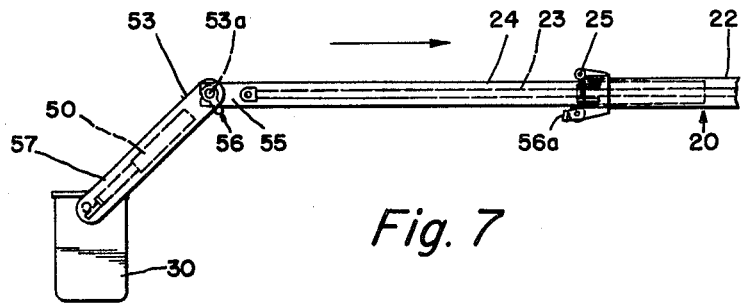
Figure 8:
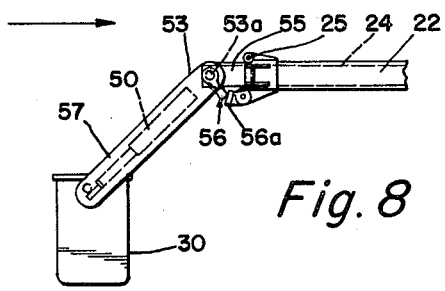
Figure 9:
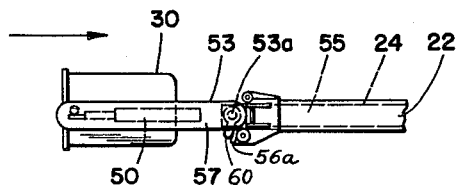
Figure 10:
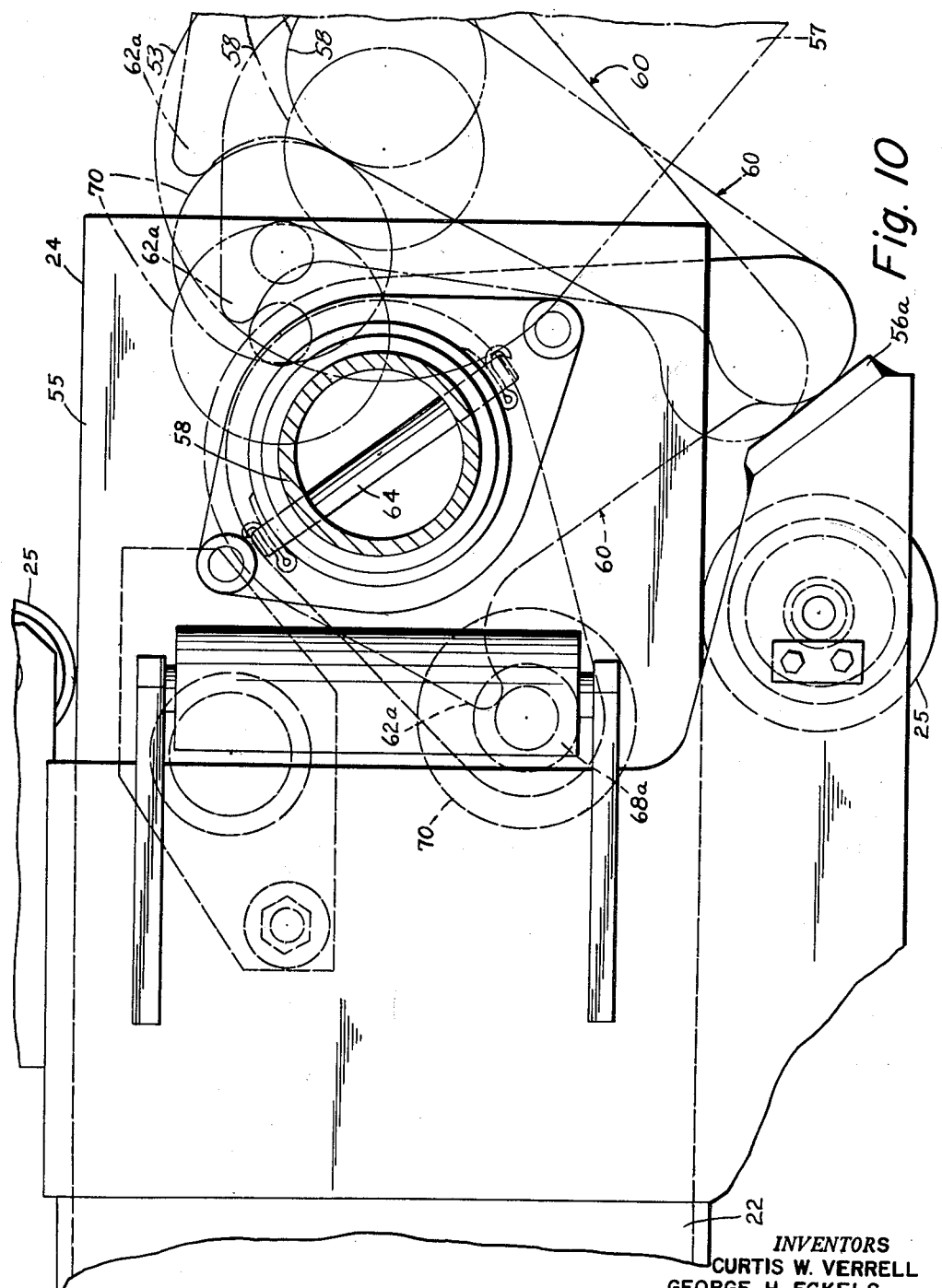
Figure 14:
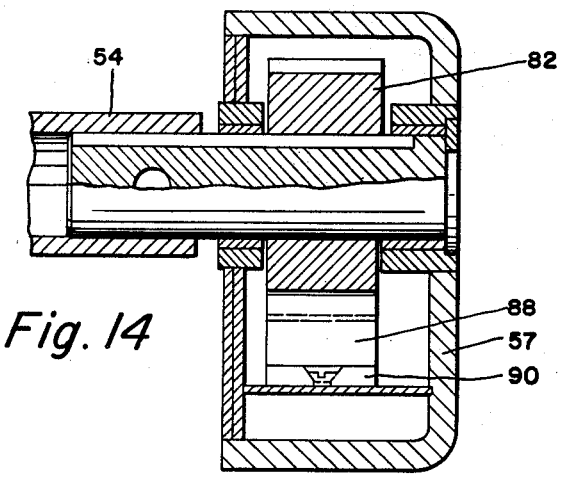
Figure 11:
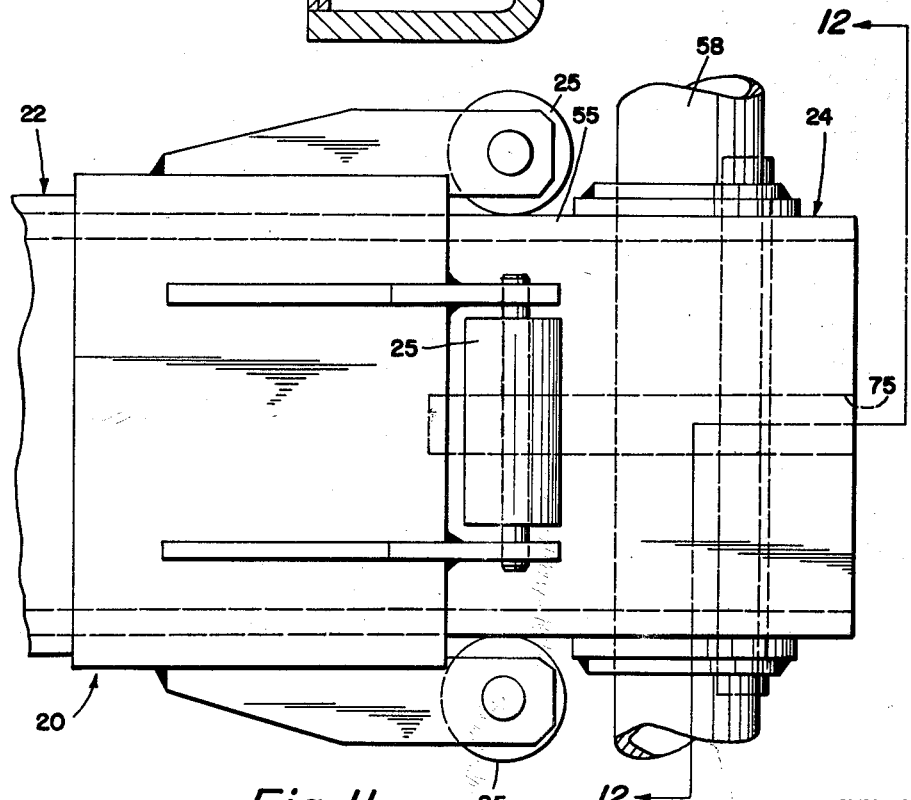
Figure 12:
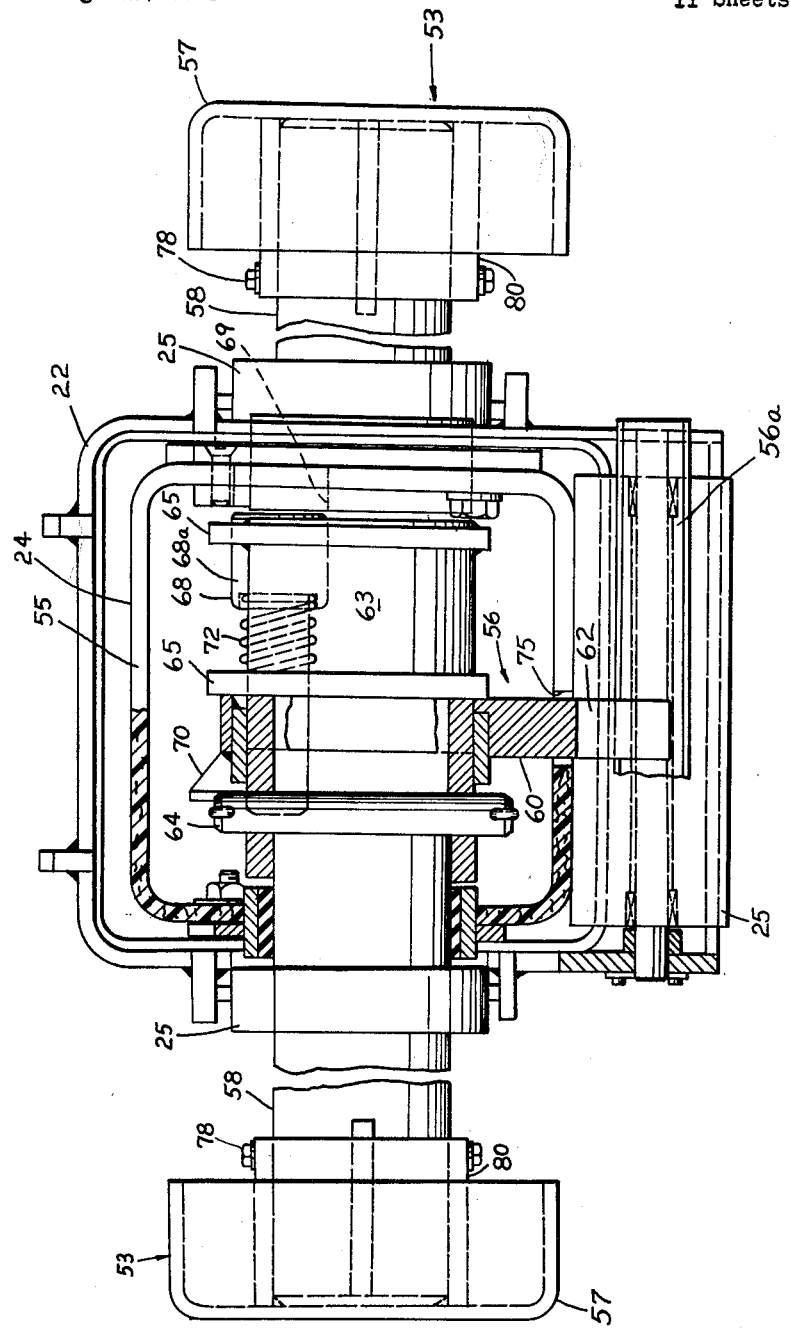
Figure 13:
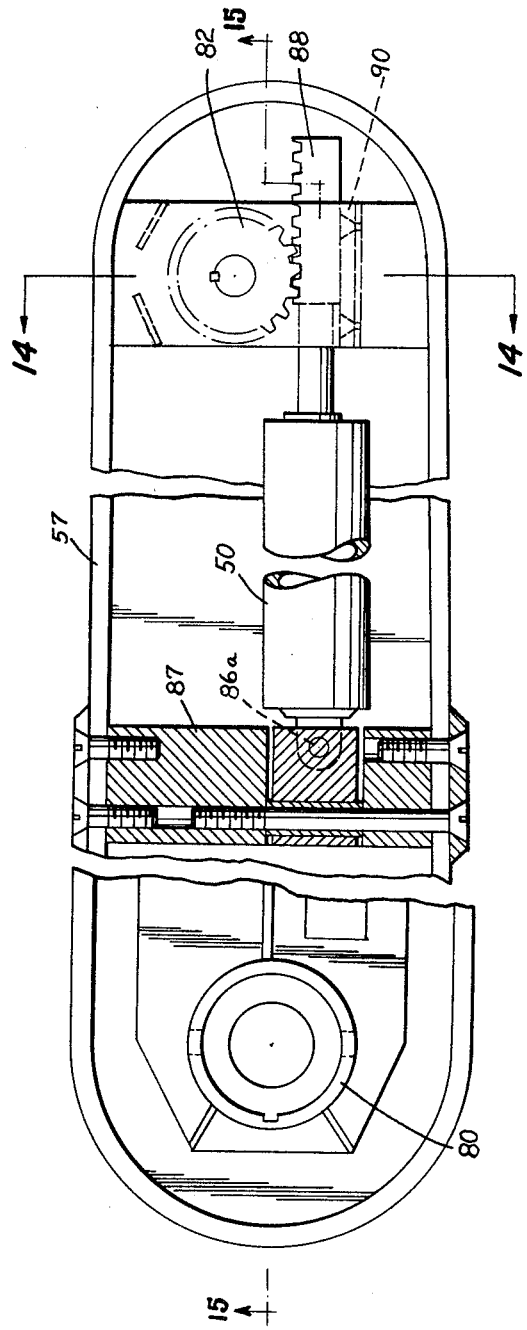
Figure 15:
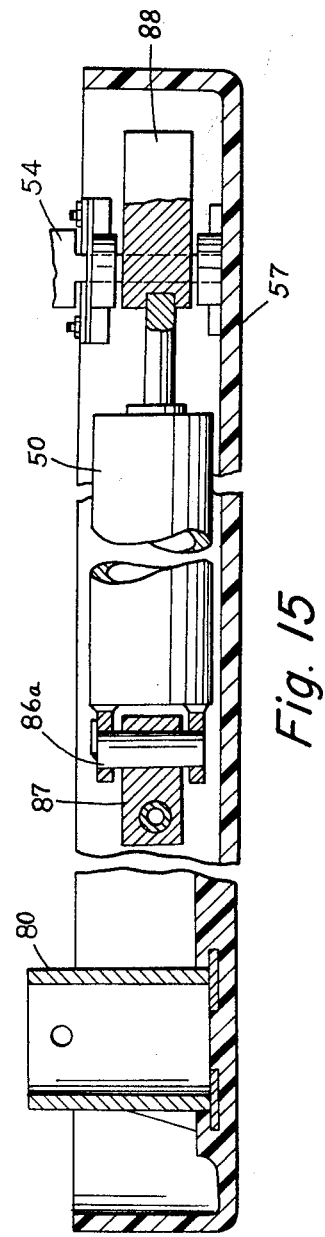
Figure 19:
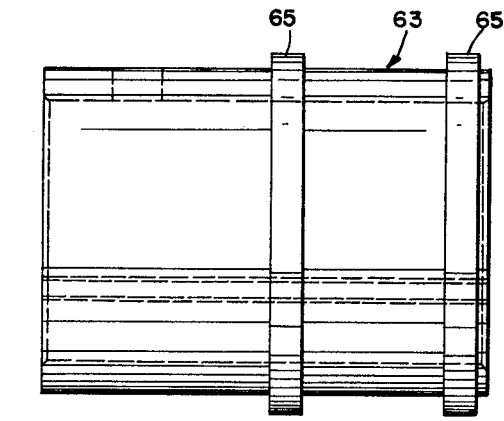
Figure 20:
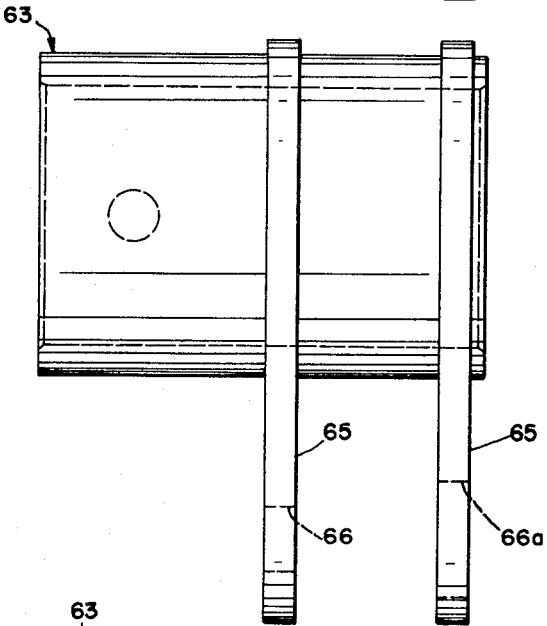
Figure 21:
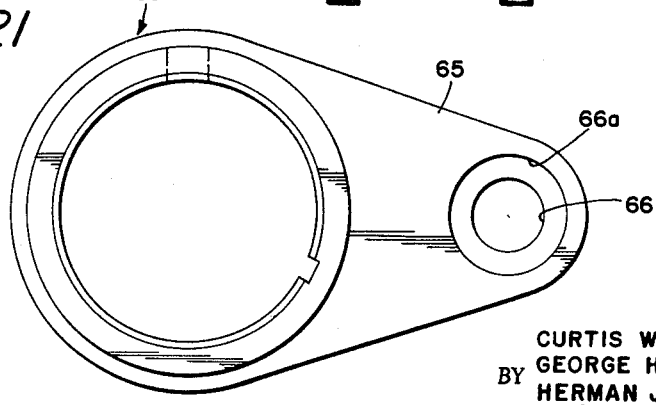

FIG. 7 is a fragmentary, more or less diagrammatic, elevational view of a tower arrangement with the tower boom in extended condition, and wherein the extensible or auxiliary boom section is articulated including a basket supporting section which is normally disposed diagonally downwardly with respect to the remainder of the boom's auxiliary section, but which is pivotable upwardly upon predetermined retraction of the boom;

FIG. 8 is a fragmentary, elevational view of the FIG. 7 embodiment illustrating the retracted condition of the boom just prior to the upward pivoting of the basket supporting section;

FIG. 9 illustrates the storage condition of the tower upon further retraction of the boom from the FIG. 8 position;

FIG. 10 is an enlarged, fragmentary, partially sectioned, detail view of cam structure for automatically pivoting the tower boom of the FIGS. 7 to 9 arragement to a generally linear condition upon predetermined retraction of the boom;

FIG. 11 is a top plan view of the FIG. 10 arrangement;

FIG. 12 is a partially sectioned view taken along the plane of line 12—12 of FIG. 11, looking in the direction of the arrows;

FIG. 13 is a partially sectioned, inner side elevational view of one of the yoke arms of the FIGS. 7-9 arrangement, illustrating in detail the motor means for swinging the bucket structure with respect to the yoke arms;

FIG. 14 is a sectional view taken generally along the plane of line 14—14 of FIG. 13 looking in the direction of the arrows;

FIG. 15 is a sectional view taken generally along the plane of line 15—15 of FIG. 13, looking in the direction of the arrows;

FIG. 16 is an enlarged side elevational view of a rotatable cam element utilized for automatically swinging the diagonally oriented yoked portion of the boom upwardly upon predetermined retraction of the boom;

FIG. 17 is an end elevational view of the FIG. 16 member;

FIG. 18 is an enlarged, partially sectioned elevational view of the locking pin for maintaining the yoked, bucket supporting portion in diagonal position, and also illustrating the cam mounted on the end of the locking pin and adapted for coaction with the cam element of FIG. 16, for retracting the locking pin from locking position;

FIGS. 19, 20 and 21 are respectively a top plan, a side elevational and an end elevational view of a bracket member adapted for mounting the locking pin member of FIG. 18 on the boom.

Referring again to the drawings and in particular to FIGS. 1 to 3, there is shown a wheeled utility vehicle 10 having a truck body 11 which carries a vertical mast or pedestal 12. Rotatably mounted for horizontal movement about mast 12 is a base arm 16. Arm 16, in the embodiment illustrated, extends diagonally upwardly from mast 12 and is preferably rotatable through 360° on the mast and in either horizontal direction. Any suitable mechanism may be utilized for so rotating arm 16 on mast 12, with such mechanism being preferably actuated by a fluid powered motor unit 17 operatively coupled to gearing 17a, for rotating arm 16. Pivotally mounted as at 18 on arm 16 is an elongated tower boom 20. Boom 20 comprises an inner section 22 and an outer section 24 disposed in telescopic relation with the inner section, for selective extension of the boom. Roller means 25 may be mounted adjacent the outer end of the boom's inner section 22, for rolling, guiding engagement with the confronting sides of the boom's outer section 24. Any suitable arrangement may be utilized for extending the outer section 24 with respect to the inner section 22 of the boom, with such extending mechanism preferably being actuated by a reciprocal fluid powered motor unit 23 disposed interiorly of the boom structure. Reference may be had to the copending United States patent application of Eckels et al. No. 15,298, filed May 16, 1960, which illustrates an arrangement which could be utilized for selective extensioning of a boom. The boom sections 22, 24 may be of rectangular configuration in vertical cross section, and section 24 may be comprised of fiberglass reinforced plastic material, to provide for electrical insulation of the outer section 24 with respect to the inner section 22. A reciprocal fluid powered motor unit 26 may be provided which at one end is pivotally connected as at 26a to the base arm 16 and at the other end thereof is pivotally connected as at 26b to bracket 27 secured to inner section 22 of the boom.

In accordance with the instant invention, the outer end portion 24a of outer section 24 of the boom is bent or offset diagonally to project obliquely away from the center line XX of the inner section 22 of the boom, and a personnel platform or bucket carrier 30 is pivotally mounted adjacent the outer end of boom section 24a. Platform 30 may be maintained in a generally horizontal condition throughout the operating range of the derrick either by gravity or preferably by a leveling mechanism, as will be hereinafter discussed in detail, thus keeping the platform level for supporting a workman thereon. Motor units 17, 23 and 26 may be controlled from the platform 30 and in a manner well known in the art.

In the embodiment illustrated, the outer end portion 24a of boom section 24 is in the form of a yoke comprising arms 32, which provide for pivotally supporting as at 32a the work platform 30.

A storage rack 34 is also preferably provided extending outwardly from the front end of the vehicle, and with such storage rack being adapted to receive the work platform 30 thereon in the storage or carried position of the tower boom illustrated in full lines in FIG. 1. A step 36 may be provided on rack 34 for facilitating the entry of a workman into the basket 30, when the boom is in the storage position.

As illustrated in the drawings, the boom 20 and associated actuating motor unit 26 may be disposed below a horizontal plane passing through the pivot point 18 of the boom 20 to the base arm 16, when the boom is in storage condition, thereby in combination with the offset condition of the personnel platform with respect to the boom, permitting a lower, optimum position of the work basket with respect to ground level (FIG. 2), or a lowered position of the basket as shown in the storage position in FIG. 1, whereby the workman may readily mount into the basket 30. Upon actuation of motor unit 26, the boom may be swung upwardly in a generally vertical plane to the position M illustrated in dot-dash lines in FIG. 1, and by extending the boom arm 20 and rotating the boom on pedestal 12, optimum positioning of the work platform with respect to an object being worked upon may be accomplished. It will be seen that if the boom of the invention is utilized for supporting a workman adjacent power lines, the off-setting of the work platform occasioned by the diagonally bent outer portion 24a of the outer section 24 of the boom arm, permits ready insertion of the work basket between vertically spaced groups of power lines (e.g. P), or over power lines, and greatly increases the clearance of the boom with respect to the power lines, thereby considerably increasing the "reach" of the boom structure.

Figure 4:
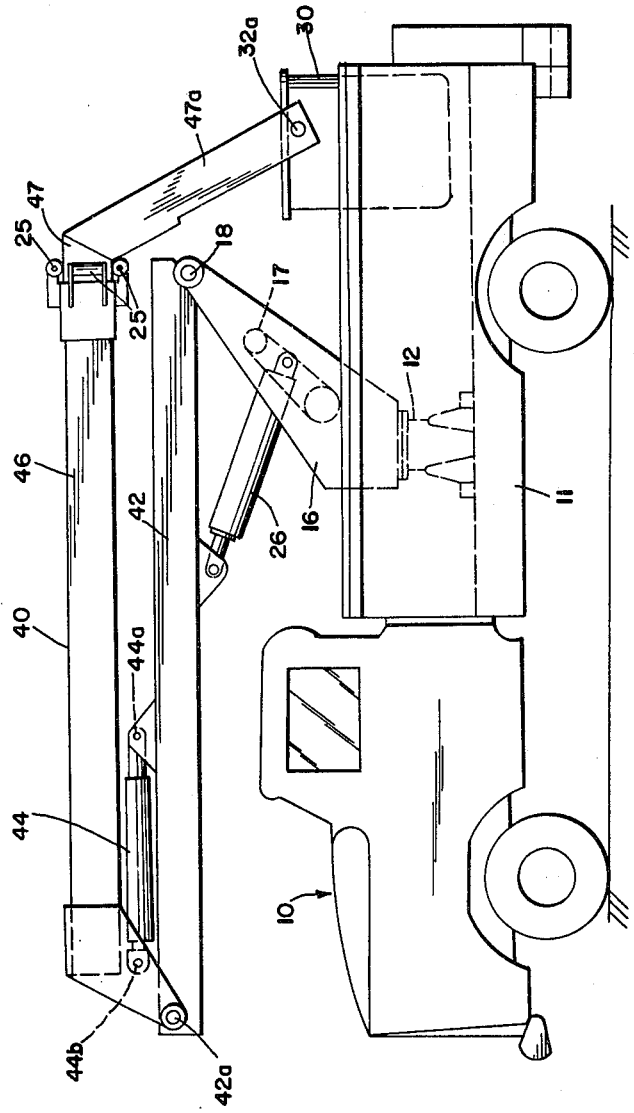
FIG. 4 is a side elevational view of a modified form of tower arrangement as mounted on a vehicle.

Referring now to FIG. 4 there is illustrated another embodiment of a vehicle mounted tower constructed in accordance with the instant invention. In this arrangement, the tower boom comprises an upper boom arm 40, and a lower boom arm 42 pivotally connected to the upper boom arm at one end thereof, as at 42a. Lower arm 42 is pivotally mounted, as at 18, to base arm 16, which in turn is rotatably mounted on pedestal 12 generally similar to the first described embodiment of the tower. Reciprocal motor unit 26 is adapted for swinging the lower arm 42 in a generally vertical plane with respect to the base arm 16, and reciprocal motor unit 44, pivotally connected as at 44a to the lower boom arm, and as at 44b, to the upper boom arm structure, is adapted for swinging the upper arm in a generally vertical plane about its pivotal connection 42a to the lower boom arm. Upper boom arm 40 may comprise an inner section 46, and an outer extensible section 47, including a diagonally extending yoked bucket supporting portion 47a, in a generally similar manner as the first described embodiment. In the storage position of this embodiment of the tower, the bucket 30 is disposed adjacent the rearward end of the vehicle, and as can be seen, is readily mounted into by a workman. In other respects, the FIG. 4 tower embodiment may be generally similar to that of the first described arrangement.

Referring now to FIGS. 5 and 6, there is illustrated another embodiment of the invention. The boom per se is generally similar to the first described embodiment of boom, but in this embodiment the bucket 30 is illustrated as being adapted for powered pivotal movement with respect to the supporting yoke arms 32 of outer portion 24a of the outer section 24 of the tower boom. In this connection there is provided a reciprocal, fluid powered motor unit 50 pivotally mounted as at 50a to the respective arm 32 and pivotally connected as at 50b to bracket 52 attached to trunnion 54 pivotally supporting the bucket 30 on boom portion 24a. Upon actuation of motor unit 50, the bucket can be readily leveled or may be swung upwardly to be disposed intermediate the arms 32 of boom section 24a, the latter position representing a storage position. Motor unit 50 may be actuated from the ground, and by means of suitable valve mechanism, to thereby provide for leveling of or swinging movement of the bucket. For instance, the motor unit 50 could be actuated by means of a suitable control valve mechanism of conventional type disposed in the cab of the vehicle and/or adjacent the pedestal portion of the tower structure.

Referring now to FIGS. 7 to 21, there is shown another embodiment of the invention, in which the outer end, diagonally extending, yoked portion 53 of outer section 24 of extensible boom 20, is pivoted as at 53a to the main portion 55 of boom section 24. Cam mechanism 56 is provided at the juncture of boom portion 53 to boom portion 55, which is adapted for coaction with abutment pad 56a on inner boom section 22, to provide for automatic movement of the boom portion 53 upwardly into linear alignment with boom portion 55 upon predetermined retraction of outer boom section 24 into the inner boom section 22. There is also provided a fluid actuated motor unit 50 disposed on boom portion 53 in a somewhat similar arrangement as illustrated in the FIGS. 5 and 6 embodiment of the invention, for pivoting the bucket or platform 30 upwardly intermediate the yoke arms of boom portion 53. FIG. 7 illustrates the extended condition of the boom, while FIG. 8 illustrates the retracted condition of the boom, with the aforementioned cam mechanism 56 initially engaging the abutment pad 56a to commence upward pivoting of boom portion 53 into linear alignment with portion 55, while FIG. 9 illustrates the stored condition of the tower, with the boom sections being in linear alignment, and with the bucket having been pivoted upwardly intermediate the arms of the yoke portion 53 of the boom. With such an arrangement, the bucket and the bucket supporting portion 53 can be moved completely out of interfering relation with the view of the driver of a vehicle, as for instance a tower arrangement as mounted on a vehicle in the manner illustrated in FIG. 1, thereby providing for a more convenient storage arrangement for the boom, and also providing for being able to change the boom from a diagonally offset arrangement to a completely linear arrangement.

Referring now to FIGS. 10 to 21, the yoke portion 53 of the outer section of the boom comprises a pair of transversely spaced arms 57 which are preferably formed of plastic laminate and are secured adjacent one end thereof to a shaft 58 extending transversely of and rotatably mounted adjacent the outer end of portion 55 of the outer section 24 of the boom.

The aforementioned cam mechanism 56 for automatically swinging the outer yoke portion 53 of the boom upwardly into linear alignment with the remainder of the boom may comprise a cam element 60 (FIGS. 16, 17) which is rotatably mounted with respect to shaft 58, and which comprises a downwardly extending arm portion 62 and an upper finger portion 62a. Cam 60 is rotatably mounted on a bracket member 63 which is secured, as by means of pin 64, to the shaft 58. Bracket member 63 comprises fin portions 65 which are provided with openings 66, 66a, therethrough. Mounted in openings 66, 66a of the fins 65 is a plunger locking element 68, which includes a locking head 68a adapted to be received in an opening 69, in a confronting wall of boom portion 55, to lock the yoke portion 53 including the arms 57, in their normally disposed diagonal position with respect to the remainder of the outer section 24 of the tower boom. The other end of plunger 68 is provided with a cam 70 thereon, which is adapted for engagement with the finger portion 62a of the cam element 60 during rotation thereof, whereby the plunger element is moved against the resistance to compression of spring 72, out of locking coaction with the opening 69 in the confronting wall of the boom portion 55, to thereby permit upward swinging movement of the yoke portion 53 of the outer section of the tower boom into alignment with the remainder of the tower boom.

Operation of the mechanism is preferably as follows: When the tower boom is in the condition illustrated in FIG. 7 of the drawings, the arms 57 are locked in their diagonally downwardly extending position with respect to the other portion 55 of the outer section of the boom, by means of the aforementioned plunger locking arrangement 68. However, when the boom section 24 is retracted into section 22 so that the arm 62 of cam 60 passes into slot 75 in boom portion 55 and engages the abutment plate 56a mounted on the leading end of boom section 22, the cam 60 is pivoted in a counter-clockwise direction (as viewed in FIG. 10) whereupon the finger 62a of the cam engages the cam element 70 of plunger 68 and moves the latter outwardly, against the resistance of spring 72, of its interlocking coaction with receiving opening 69 in the confronting side of boom portion 55, until the finger portion 62a engages the shaft portion of the locking element, and as shown in dot-dash lines in FIG. 10. Thereupon, the cam member 60 can no longer pivot with respect to the shaft 58 and further inward movement of the outer section 24 of the boom causes the shaft 58, including bracket 63 and the aforementioned cam member 60 to pivot counter-clockwise about the axis of the shaft 58 to the full line position illustrated in FIGS. 9 and 10 of the drawings, wherein the yoke arms 57 are in linear alignment with the lengthwise axis of the boom. The yoke portion 53 may be held in this linear position by the pull on the yoke portion 53 by the power unit 23 disposed interiorly of the boom section. Upon extension of the boom, the weight of the yoke portion and associated basket 30 causes the arms 57 to move downwardly to their diagonal position whereupon the plunger lock 68 engages in locking coaction to hold the arms in such diagonally disposed position.

Referring now to FIGS. 13 through 15, each of the arms 57 is preferably comprised of fiberglass reinforced, laminated plastic construction, as aforementioned, well known in the art, and on its inner side is provided with a hub 80 which is adapted for attachment as by means of bolt 78 to the aforementioned shaft 58. Rotatably mounted on each of the arms is one of the supporting bosses 54 of the basket, and with a spur gear 82 being secured to such boss for rotation therewith. The aforementioned fluid pressure, double acting motor unit 50 is mounted in one of the arms, and is pivoted as at 86a to a columnar abutment member 87 bridging the respective arm and at its other end is provided with a rack member 88 which is adapted to engage in sliding coaction with wear plate member 90 mounted in underlying relation to the rack. It will be seen that upon application of fluid pressure to the motor unit, the piston rod of the motor unit is caused to reciprocate thereby rotating the spur gear 82 and causing pivotal swinging of the basket 30. The basket 30 can be thus swung upwardly to the position illustrated in FIG. 9 of the drawings for ready disposal of such basket out of interfering relationship with a driver's vision in the event that the boom is mounted on the vehicle in the manner illustrated in FIGS. 1 and 2 of the drawings. It will be seen, therefore, that motor unit 50 may be utilized to swing the basket 30 about a transverse axis extending between the yoke arms 57, and for leveling the basket as need be. The rack is of sufficient length to insure that the bucket can be swung upwardly to a storage position as illustrated in FIG. 9 and in a position where it is out of interfering relation with the tower boom.

From the foregoing discussion and accompanying drawings, it will be seen that the instant invention provides a tower arrangement which can be moved from a storage position through a plurality of adjusted positions, and one wherein the personnel basket is offset from the axis of the boom supporting arm by utilization of an offset portion of an auxiliary section of the boom arm, thereby greatly facilitating the movement of the personnel basket with respect to objects being worked upon.

The terms and expressions which have been used are used as terms of description and not of limitation, and there is no intention in the use of such words and expressions of excluding any equivalents of any of the features shown or described, or portions thereof, but it is recognized that various modifications are possible within the scope of the invention claimed.

We claim:

1. In a mobile aerial tower, a boom mounted on a support, said boom comprising a plurality of elongated sections adapted for relative lengthwise movement with respect to one another, the outermost of said boom sections comprising an outer end portion pivoted to the remainder of said outermost section, platform means supported on said outer end portion with the latter being normally disposed obliquely with respect to the longitudinal axis of said remainder, means for locking said outer end portion in said oblique position, and cam means for deactivating said locking means and pivoting said outer end portion into linear alignment with said remainder upon predetermined retraction of said outermost boom section.

2. A mobile aerial tower in accordance with claim 1 wherein said locking means comprises a spring loaded plunger on said outer end portion adapted to be received in a coacting opening in said remainder to lock said outer end portion in said oblique position, and a frusto-conical shaped head on said plunger, said head being adapted for engagement with said cam means to deactivate said plunger.

3. In a mobile aerial tower comprising a boom mounted on a support, said boom comprising a plurality of sections disposed in telescopic relation and adapted for relative lengthwise movement with respect to one another to selectively vary the effective length of said boom, the outermost of said boom sections comprising an outer end yoke portion pivoted to the remainder of said outermost section, said outer end yoke portion normally being disposed obliquely with respect to the longitudinal axis of said remainder and including a locking means for maintaining said normal oblique position, a work platform swingably mounted in depending relation between the arms of said outer end yoke portion, power means coacting between said outer end portion and said work platform for selectively swinging said work platform, a cam rotatably mounted on said pivotal connection of said outer end portion to said remainder, an abutment mounted on the boom section adjacent to said outermost boom section, said cam being adapted for engagement with said abutment upon predetermined retraction of said outermost boom section into said adjacent boom section, and means adapted for coupling said cam to said outer end portion upon predetermined rotation of said cam whereby said outer end portion is moved into linear alignment with respect to said remainder.

4. A mobile aerial tower in accordance with claim 3, wherein said locking means comprises a spring loaded plunger mounted adjacent the juncture of said outer end portion with said remainder, said plunger having retracting means thereon, said cam having a finger portion thereon, said finger portion being adapted for sliding engagement with the retracting means to deactivate said plunger upon predetermined rotation of said cam, to thereby permit pivotal movement of said outer end portion about its pivotal conneciton to said remainder.

5. In a mobile aerial tower, an elongated boom pivotally mounted on a support for movement in a generally vertical plane, said boom including an inner section and an outer section disposed in telescopic relation with respect to one another, power means coacting between said boom sections for moving the latter lengthwise with respect to one another and thereby selectively varying the effective length of said boom, said outer boom section including an outer end portion pivoted to said outer boom section, said outer end portion being normally disposed obliquely relative to the remainder of said outer boom section and extending outwardly and forwardly therefrom, means for releasably holding said outer end portion in said oblique position, a work platform movably supported on said outer end portion so that the connection of said work platform to said outer end portion is offset from the lengthwise axis of said boom, and means for selectively pivoting said outer end portion into generally linear alignment with said axis, said last mentioned means including an abutment on said inner boom section adapted for engagement with a pivotable abutment on said outer end portion of the outer boom section for swinging said outer end portion into linear alignment with said axis upon actuation of said power means to cause predetermined retraction of said outer boom section with respect to said inner boom section.

6. A mobile aerial tower in accordance with claim 5, wherein said work platform comprises a bucket-like member swingably depending from said outer end portion and including fluid powered reciprocal motor means coacting between said outer end portion and said bucket-like member for adjusting the position of the bucket-like member with respect to said outer end portion, said motor means being operative to swing said bucket-like member from said depending condition into general parallelism and alignment with said outer end portion.

7. In a mobile aerial tower, a boom pivotally mounted on a support for movement in a generally vertical plane, said boom comprising a plurality of elongated sections including an outer section and an inner section adapted for relative lengthwise movement with respect to one another, power means coacting between said boom sections for so moving the latter lengthwise of one another for selectively varying the effective length of said boom, said outer section comprising an outer end portion pivoted to the remainder of said outer section, a work platform swingably supported on said outer end portion, said outer end portion normally being disposed obliquely with respect to the longitudinal axis of said remainder and extending outwardly and forwardly from the latter, locking means for releasably maintaining said outer end portion in said oblique position, motor means coacting between said outer end portion and said work platform for selectively swinging said work platform with respect to said outer end portion, and means on said outer end portion of said outer section and on said inner section of said boom adapted for abutting coaction to deactivate said locking means and pivot said outer end portion into generally linear alignment with said remainder when said outer section is retracted a predetermined amount by said power means.

8. A mobile aerial tower in accordance with claim 7, wherein said outer end portion comprises a yoke including laterally spaced arm portions between which said work platform is swingably mounted and said coacting motor means comprises a fluid actuated reciprocal motor unit mounted on one of the arms of said yoke, a rack secured to said motor unit, a gear secured to said work platform, said rack and gear being in coacting meshing relation for pivoting said work platform upon predetermined actuation of said motor unit.

9. In a mobile aerial tower, an elongated boom pivotally mounted on a support, said boom comprising a plurality of sections including an inner section and an outer section disposed for relative lengthwise movement with respect to one another, means for actuating said outer section lengthwise relative to said inner section for selectively varying the effective length of said boom, said outer section including an outer end portion movably coupled to the remainder of said outer section, said outer end portion being normally disposed generally obliquely relative to said remainder and extending outwardly and forwardly therefrom, a work platform movably supported on said outer end portion and means on said outer section and on said inner section adapted for coaction to move said outer end portion into generally linear alignment with said remainder upon predetermined retraction of said outer section with respect to said inner section.

10. In a mobile aerial tower, a boom mounted on a support, said boom comprising a plurality of elongated sections adapted for relative lengthwise movement with respect to one another, the outermost of said boom sections comprising an outer end portion movably coupled to the remainder of said outermost section, platform means supported on said outer end portion with the latter being normally disposed obliquely with respect to the longitudinal axis of said remainder and extending outwardly and forwardly from the latter, means for locking said outer end portion in said oblique position, and means for deactivating said locking means and moving said outer end portion into general linear alignment with said remainder upon predetermined retraction of said outermost boom section.

References Cited in the file of this patent
UNITED STATES PATENTS

| 2,936,848 | Hall | May 17, 1960 |
| 2,938,594 | Eitel | May 31, 1960 |
| 2,996,141 | Eitel | Aug. 15, 1961 |
| 3,056,510 | Garnett | Oct. 2, 1962 |

FOREIGN PATENTS

| 550,896 | Italy | Nov. 10, 1956 |